(12) United States Patent
Suzuki

(10) Patent No.: US 9,121,725 B2
(45) Date of Patent: Sep. 1, 2015

(54) NAVIGATION DEVICE AND NEAREST POINT SEARCH METHOD

(75) Inventor: Toshikazu Suzuki, Tokyo (JP)

(73) Assignee: Sony Corporation, Tokyo (JP)

( * ) Notice: Subject to any disclaimer, the term of this patent is extended or adjusted under 35 U.S.C. 154(b) by 1989 days.

(21) Appl. No.: 12/125,605

(22) Filed: May 22, 2008

(65) Prior Publication Data

US 2009/0055094 A1 Feb. 26, 2009

(30) Foreign Application Priority Data

Jun. 7, 2007 (JP) ................................ P2007-151769

(51) Int. Cl.
*G01C 21/36* (2006.01)
*G09B 29/10* (2006.01)

(52) U.S. Cl.
CPC .......... *G01C 21/3682* (2013.01); *G09B 29/106* (2013.01)

(58) Field of Classification Search
USPC ...................................... 701/209; 340/995.24
See application file for complete search history.

(56) References Cited

U.S. PATENT DOCUMENTS

| | | | | |
|---|---|---|---|---|
| 5,911,773 | A * | 6/1999 | Mutsuga et al. | 701/414 |
| 5,964,821 | A * | 10/1999 | Brunts et al. | 701/487 |
| 6,067,502 | A * | 5/2000 | Hayashida et al. | 701/428 |
| 6,597,983 | B2 * | 7/2003 | Hancock | 701/520 |
| 7,577,521 | B2 * | 8/2009 | Fukumi | 701/426 |
| 2004/0260465 | A1 * | 12/2004 | Tu | 701/209 |
| 2006/0089788 | A1 * | 4/2006 | Laverty | 701/202 |
| 2006/0167632 | A1 * | 7/2006 | Ohnishi et al. | 701/213 |
| 2006/0212218 | A1 * | 9/2006 | Smith | 701/209 |
| 2007/0179711 | A1 * | 8/2007 | Tobiyama et al. | 701/211 |
| 2007/0219714 | A1 * | 9/2007 | Uchida et al. | 701/209 |
| 2009/0150349 | A1 * | 6/2009 | Cartin et al. | 707/3 |
| 2010/0256904 | A1 * | 10/2010 | Ishibashi et al. | 701/209 |

FOREIGN PATENT DOCUMENTS

| | | |
|---|---|---|
| JP | 2001-133283 | 5/2001 |
| JP | 2002-350151 | 12/2002 |
| JP | 2004-20883 | 1/2004 |
| JP | 2005-55259 | 3/2005 |
| JP | 2005-181125 | 7/2005 |
| JP | 2005-292970 | 10/2005 |
| JP | 2006-84186 | 3/2006 |
| JP | 2006-258441 | 9/2006 |
| JP | 2006-300522 | 11/2006 |

* cited by examiner

*Primary Examiner* — Nicholas Kiswanto
(74) *Attorney, Agent, or Firm* — Oblon, McClelland, Maier & Neustadt, L.L.P.

(57) ABSTRACT

The present invention makes the user easily search the nearest point which is useful for the user without making the user perform a complicated operation. The present invention provides a navigation device that obtains a current position based on information from GPS satellites, and guides a travel path from the current position to the destination on a map image which includes a display unit that displays the map image, a search unit that searches a nearest point existing around a vehicle position on the map image, a search subject range determination unit that, when a search subject area setting frame in searching the nearest point is specified by a user, determines the search subject area setting frame as a search subject range in searching by the search unit.

19 Claims, 9 Drawing Sheets

NAVIGATION DEVICE AND NEAREST POINT SEARCH METHOD

CROSS REFERENCES TO RELATED APPLICATIONS

The present invention contains subject matter related to Japanese Patent Application JP2007-151769 filed in the Japanese Patent Office on Jun. 7, 2007, the entire contents of which being incorporated herein by reference.

BACKGROUND OF THE INVENTION

1. Field of the Invention

The present invention relates to a navigation device and a nearest point search method which are desirably applied to a vehicle navigation device.

2. Description of the Related Art

There has been proposed a navigation device that, for an arbitrary point on a navigation map image, within a predetermined range where the surrounding area of the arbitrary point set as a criterion, researches nearest registered point information, and displays the search result (for example, refer to Patent Publication No. 2917899)

SUMMARY OF THE INVENTION

Meanwhile, in the navigation device having the configuration described above, since the direction of an area to be searched in searching registered point information is not prescribed, there is a problem that registered point information of an area which is not desired by the user is searched, and useless registered point information which is meaningless for the user is provided, and the user is forced to perform a complicated operation of searching again.

In view of the above-identified circumstances, it is therefore desirable to provide a navigation device and a nearest point search method which can make the user easily search the nearest point which is useful for the user without making the user perform a complicated operation.

According to an embodiment of the present invention, in case of searching the nearest point using a navigation device that obtains the current position based on information from satellites, and guides a travel path from the current position to the destination on a map image, the map image is displayed on a predetermined display means, and, when the nearest point existing around the vehicle position on the map image is searched by a predetermined search means, the user is made to specify a search subject area setting frame in searching the nearest point, the nearest point is searched with the search subject area setting frame determined as a search subject range by the search means, and the nearest point obtained by the search is set as the search processing result. Accordingly, only the useful nearest point for the search range desired by the user can be provided as the search processing result.

Accordingly, it becomes possible to realize a navigation device and a nearest point search method which can make the user easily search the nearest point which is useful for the user without making the user perform a complicated operation.

The nature, principle and utility of the invention will become more apparent from the following detailed description when read in conjunction with the accompanying drawings in which like parts are designated by like reference numerals or characters.

DETAILED DESCRIPTION OF THE PREFERRED EMBODIMENTS

Now, embodiments of the present invention will be described in greater detail by referring to the accompanying drawings.

(1) External Configuration of PND

Figure 1:
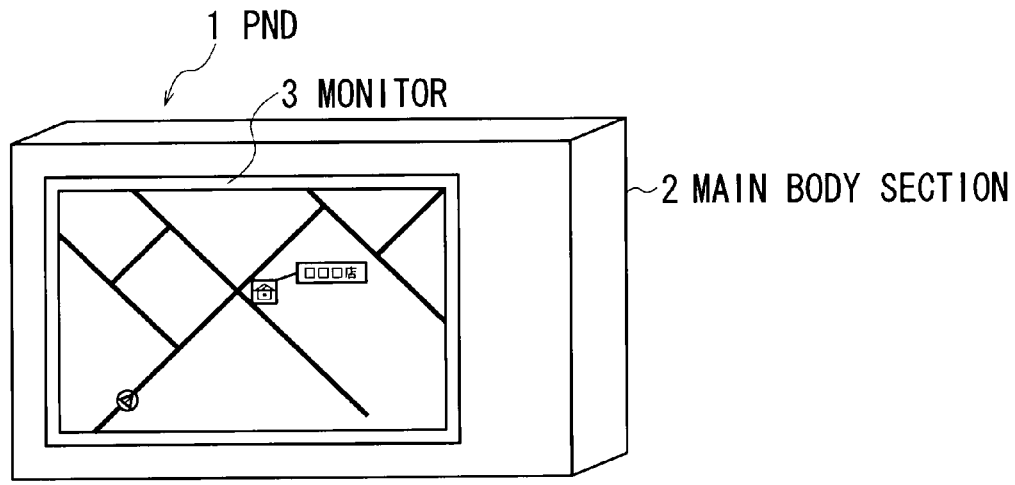
FIG. 1 shows a schematic perspective view indicative of an external configuration of a PND.

In FIG. 1, a reference numeral 1 represents a personal navigation device (referred to as PND) which is portable and can be carried about, and is mainly used in a vehicle. The PND 1 has a rectangular main body section 2, and a monitor 3 arranged on the front surface of the main body section 2, and generates a map image or the like according to map data stored in a nonvolatile memory, a hard disc and the like built in the main body section 2, and displays the map image on the monitor 3.

(2) Hardware Configuration of PND

Figure 2:
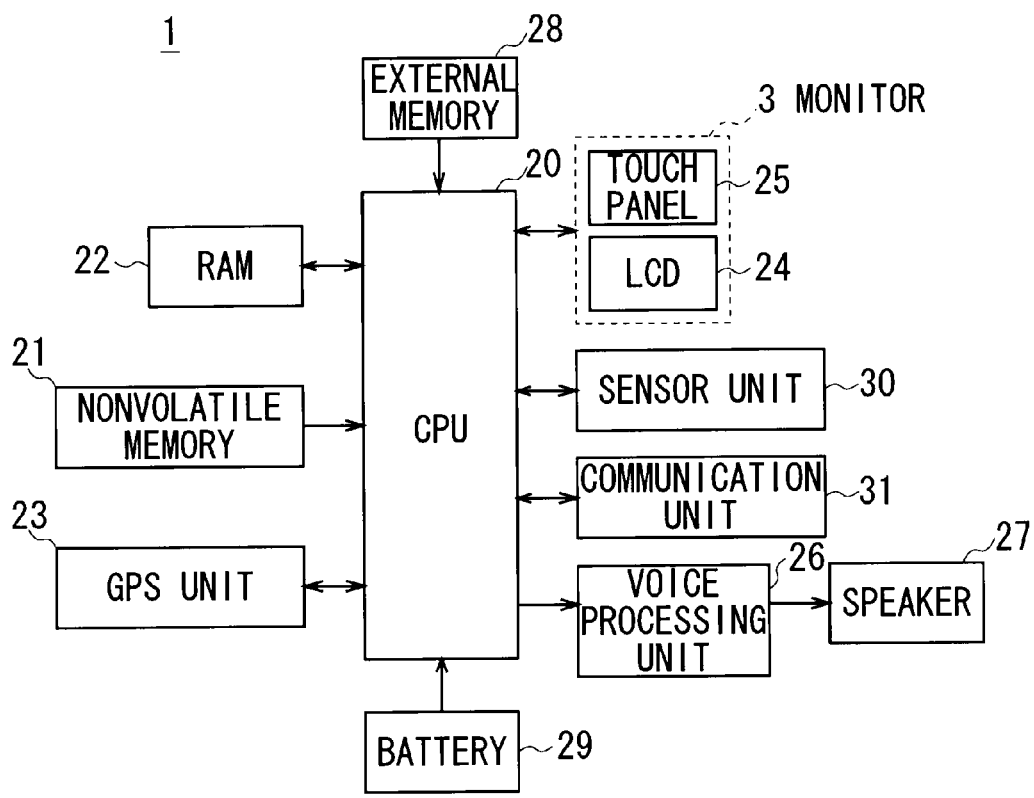
FIG. 2 shows a schematic block diagram indicative of a circuit configuration of the PND.

As shown in FIG. 2, the PND 1 is operated by power supplied from a battery 29, and a central processing unit (CPU) 20 controls the entire operation. By reading out a basic program or various application programs stored in a nonvolatile memory 21 and executing the programs on a random access memory (RAM) 22, the PND 1 realizes the general navigation function and nearest point search processing function which will be described later.

In the PND 1, map data indicative of a map of the entire country is stored in the nonvolatile memory 21 such as a static random access memory (SRAM), a flash memory backed up by the battery 29, and point of interest (POI) data representing the interest points such as facilities is stored such that the points correspond to positions on the map.

The PND 1 has an external memory 28 that is, for example, an optical disc such as a compact disc-read only memory (CD-ROM), a digital versatile disc-read only memory (DVD-ROM), and a hard disc drive, and high-capacity data such as the map data, POI data, contents data of search information or music/video can be stored.

Furthermore, by receiving an electric wave from global positioning system (GPS) satellites using a GPS unit 23, the PND 1 calculates GPS information including the latitude, longitude, altitude, and the like, all the time, and sends the GPS information to the CPU 20.

By comparing the GPS information supplied from the GPS unit 23 and the map data stored in the nonvolatile memory 21, the CPU 20 of the PND 1 reads out map data of a predetermined range including a position where the PND 1 exists at the present moment (that is, vehicle position where vehicle to which the PND 1 is mounted exists), and displays a map image of a predetermined magnification ratio representing the vehicle position and the periphery thereof on a liquid crystal display (LCD) 24 of the monitor 3 according to the map data.

Furthermore, according to the user operation with respect to a touch panel 25 arranged on the surface of the LCD 24 of the monitor 3, in case POI data is arbitrarily selected as the destination, the CPU 20 of the PND 1 searched an approaching path etc., to the destination corresponding to the POI data from the vehicle position of a vehicle, and generates an navigation map image representing the approaching path to display the navigation map image on the LCD 24.

At this time, the CPU 20 of the PND 1 displays the navigation map image representing the approaching path on the LCD 24, and, while the vehicle is traveling to the destination in accordance with the approaching path through a voice processing unit 26, generates voice information to guide and aid the driving of the user (hereinafter, this is referred to as navigate), and outputs a navigation voice from a speaker 27.

In this way, the PND 1 can provide a navigation function to navigate the vehicle to the destination desired by the user.

Furthermore, the PND 1 has a sensor unit 30 including a vehicle speed sensor which detects the wheel rotation number of the vehicle, a vibration gyro sensor which detects the rotational angular speed of the vehicle body, an acceleration sensor which detects the acceleration of the vehicle, a vibration sensor which detects the vibration of the vehicle, a parking brake switch detection sensor which detects the state of the traveling device of the vehicle, a brake lamp switch detection sensor, a steering rudder angle sensor, and a throttle opening sensor. The vehicle position can be detected more accurately based on the detection result of the sensor unit 30 and GPS information of the GPS unit 23.

Furthermore, the PND 1 has a communication unit 31 including a wired communication unit such as a universal serial bus (USB) cable, a wireless communication unit such as Bluetooth (registered trademark), an offline communication unit using a removable memory or a memory stick (registered trademark of Sony Corporation), and can communicate with other electronic devices or a network such as a local area network (LAN), wide area network (WAN), etc.

(3) Software Functional Block Configuration Realizing Nearest Point Search Processing Function by PND Next, a software function block in which, in accordance with a nearest point search processing program which is a basic program or various application programs, the CPU 20 of the PND 1 receives the operation from the user and specifies a search subject range in searching the nearest point on a navigation map image displayed on the LCD 24 of the monitor 3, and presents the result of performing the nearest point search processing in the search subject range will be explained.

Figure 3:
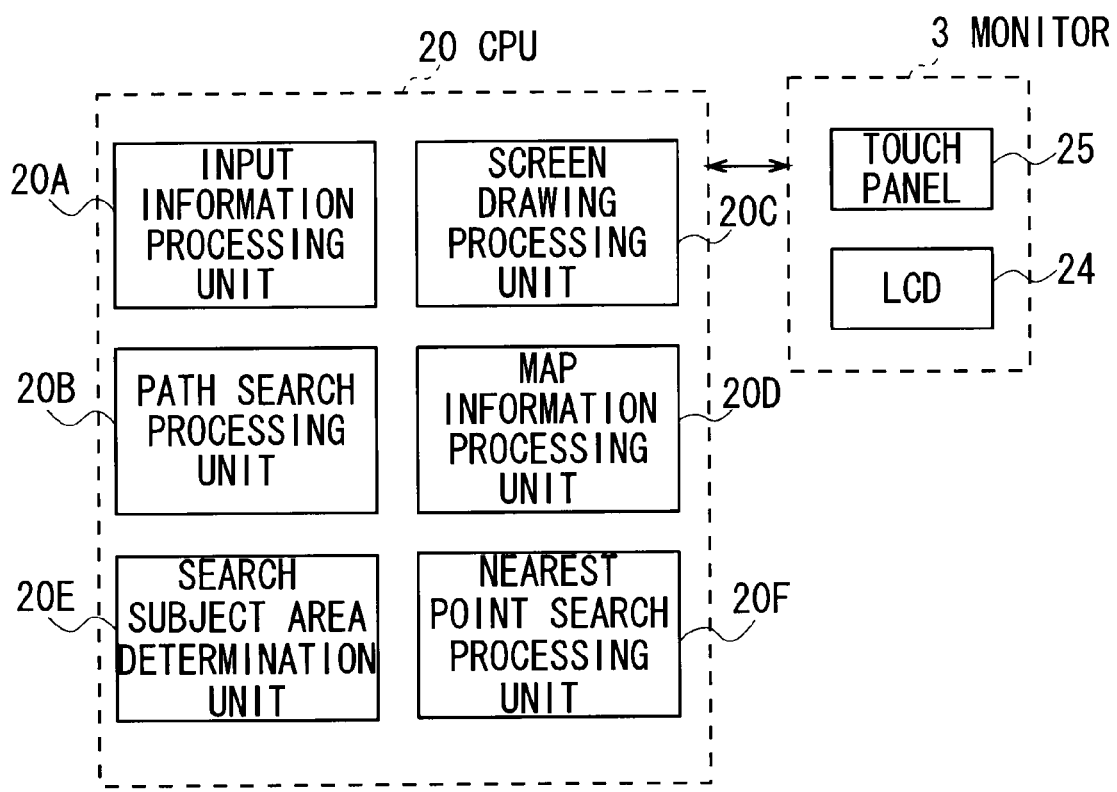
FIG. 3 shows a schematic block diagram indicative of the functional block of nearest point search processing.

As shown in FIG. 3, the CPU 20 of the PND 1 accepts the touch operation by the fingertip of the user with respect to the touch panel 25 of the monitor 3 using an input information processing unit 20A, and calculates a point on the map according to the touch operation.

At this time, from the nonvolatile memory 21 (FIG. 2) or external memory 28, the CPU 20 of the PND 1 reads out map data which is original data of a map image including the point, and a map information processing unit 20D converts the map data to a structure which can be drawn on the LCD 24, and a path search processing unit 20B obtains the approaching path from the vehicle position calculated based on the GPS information from the GPS unit 23 to the destination.

The CPU 20 of the PND 1 generates a navigation map image to perform the route guidance using a screen drawing processing unit 20C based on various information, or the display range with respect to the LCD 24 of the map image, map data of a predetermined range corresponding to the map image of the display range, approaching path, etc., and displays the navigation map image on the LCD 24 of the monitor 3.

In case the CPU 20 of the PND 1 performs the nearest point of interest search processing in the periphery of the current vehicle position with the navigation map image displayed on the LCD 24 of the monitor 3, a search subject area determination unit 20E determines the search subject range specified by the user, and sends the search subject range to a nearest point search processing unit 20F.

The CPU 20 of the PND 1 performs the nearest point search processing in the search subject range using the nearest point search processing unit 20F based on the search subject range sent from the search subject area determination unit 20E, and presents the search processing result on the navigation map image of the LCD 24.

(4) Nearest Point Search Processing

Figure 4:
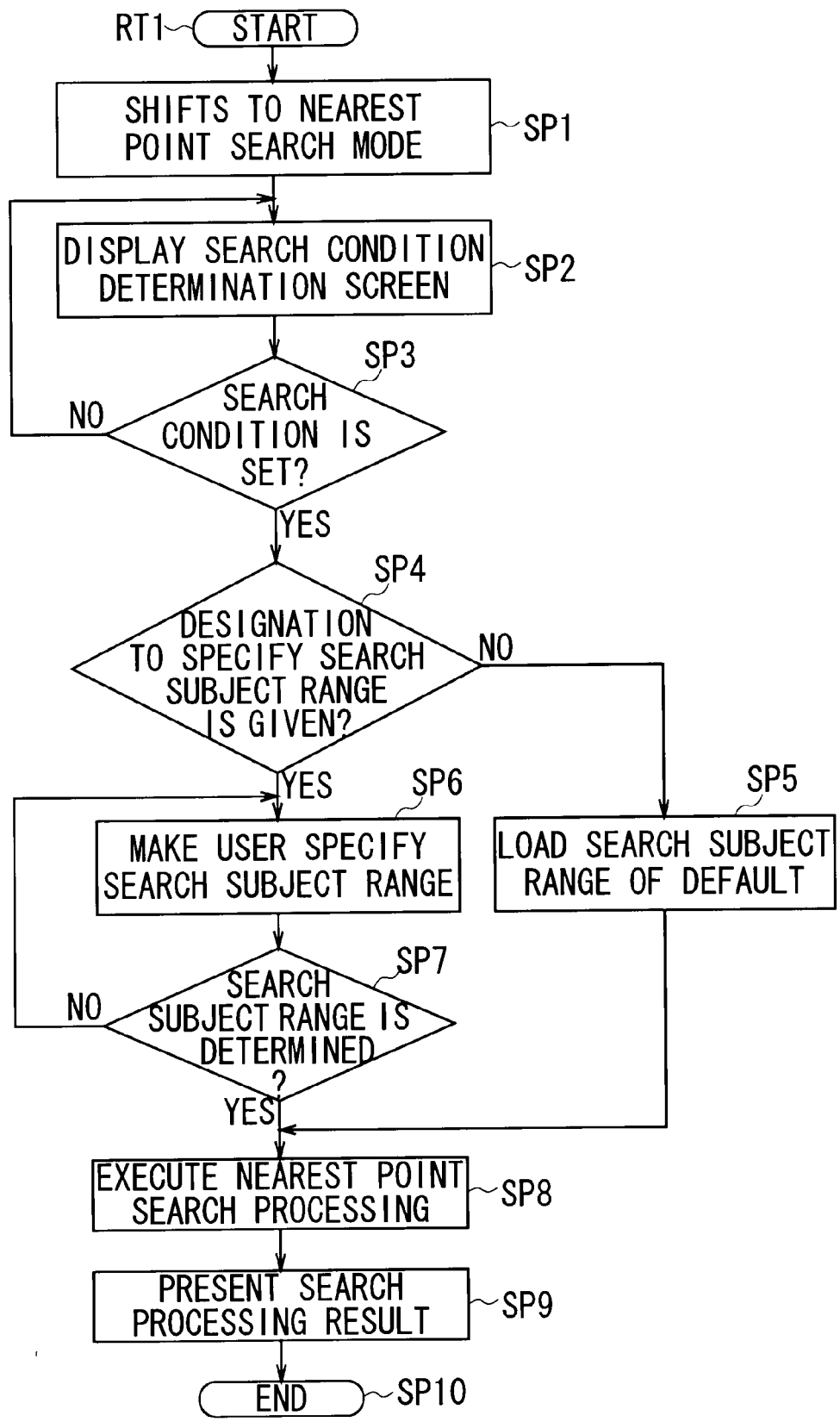
FIG. 4 shows a flowchart indicative of the nearest point search processing procedure.

The specific processing procedure of the nearest point of interest search processing function of the PND 1 will be explained using a flowchart shown in FIG. 4.

Actually, in accordance with the nearest point search processing program which is an application program launched on the RAM 22 from the nonvolatile memory 21, the CPU 20 of the PND 1 starts the routine RT1 from the start step, and goes to the next step SP1. When it is recognized that a nearest point search icon (not shown) in a menu is pressed to be operated by the user on the navigation map image, the processing shifts to a nearest point search mode, and goes to the next step SP2.

Figure 5:
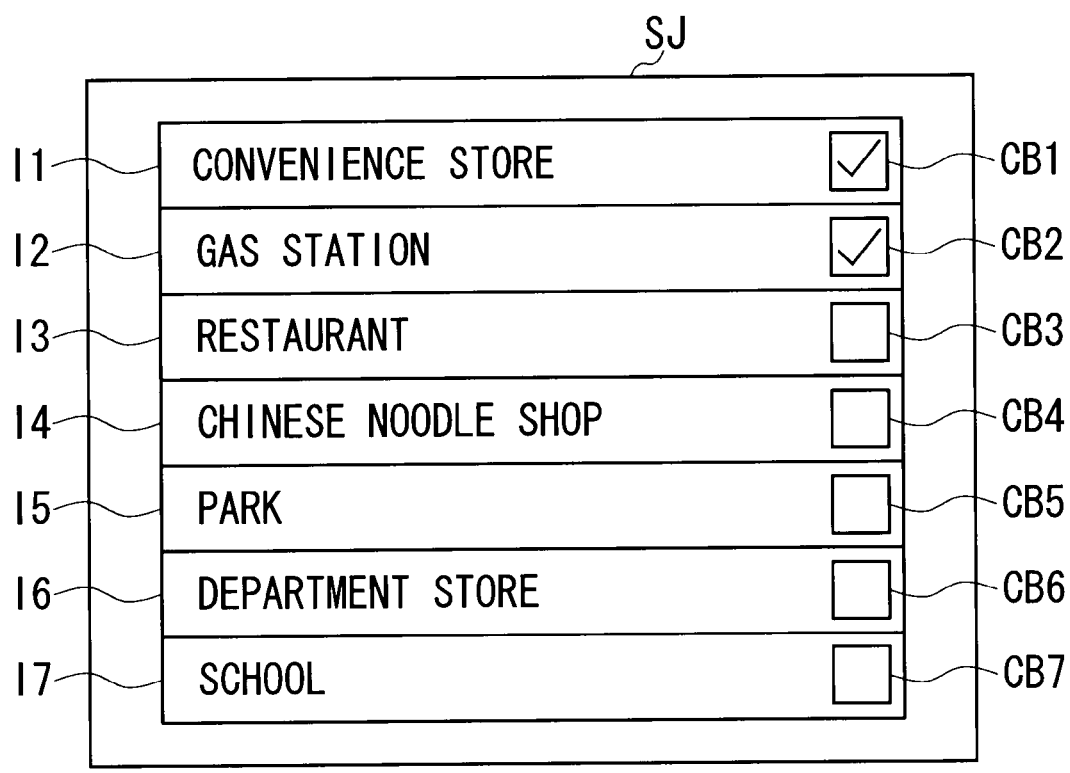
FIG. 5 shows a schematic view indicative of a search condition determination screen.

In step SP2, in the nearest point search mode, the CPU 20 of the PND 1 reads out a search condition determination screen SJ shown in FIG. 5 from the nonvolatile memory 21, and overlaps and displays the search condition determination screen SJ on the navigation map image, and the processing goes to the next step SP3.

On the search condition determination screen SJ (FIG. 5), various items I1 to I7 (convenience store, gas station, restaurant, Chinese noodle shop, park, department store, school, etc.) which are obtained by dividing a plurality of POI data previously registered in the nonvolatile memory 21 for respective genres of plural kinds are displayed, and check boxes CB1 to CB7 to select a subject desired to be searched by the user as the nearest point are arranged for the respective items I1 to I7.

In step SP3, the CPU 20 of the PND 1 determines whether or not a search condition under which the user desires the nearest point search processing is set on the search condition determination screen SJ. When the negative result is obtained, this represents that no check mark is put in the check boxes CB1 to CB7 of the items I1 to I7 on the search condition determination screen SJ, that is, the search condition of the nearest point is not set. At this time, the CPU 20 of the PND 1 returns to step SP2, and, with the search condition determination screen SJ displayed continuously, waits for a check mark to be put in the check boxes CB1 to CB7.

On the other hand, when the positive result is obtained in step SP3, this represents that a check mark is put in the check boxes CB1 to CB7 of the items I1 to I7 on the search condition determination screen SJ, that is, the search condition of the nearest point has been set already. At this time, the CPU 20 of the PND 1 goes to the next step SP4.

In step SP4, since the search condition is set, instead of the search condition determination screen SJ, the CPU 20 of the PND 1 inquires whether or not the user him or herself specifies the search subject range of the nearest point on the navigation map image, and determines whether or not a designation to specify the search subject range is given by the user.

For example, of the "specify" icon and "not specify" icon overlapped and displayed on the navigation map image, in case the "not specify" icon is touched to be operated, the negative result is obtained and the CPU 20 of the PND 1 goes to the next step SP5.

In step SP5, since the search subject range is not specified, the CPU 20 of the PND 1 reads out an initial search subject range of default from the nonvolatile memory 21, which is prepared for the search processing for the nearest point, and the processing goes to the next step SP8.

The initial search subject range of default is, similar to the conventional case, an inner area of a circle having a radius of a predetermined distance with the vehicle position on the navigation map image set to the center, and the search subject area is set based on the vehicle position and the directional property is not prescribed.

On the other hand, when the positive result is obtained in step SP4, this represents that the "specify" icon is touched to be operated, and the user has a will to specify the search subject area, and thus the CPU 20 of the PND 1 goes to the next step SP6.

In step SP6, the CPU 20 of the PND 1 makes the user specify the search subject range, in which the user desires the search processing for the nearest point, on the navigation map image displayed on the LCD 24, and the processing goes to the next step SP7.

Figure 6:
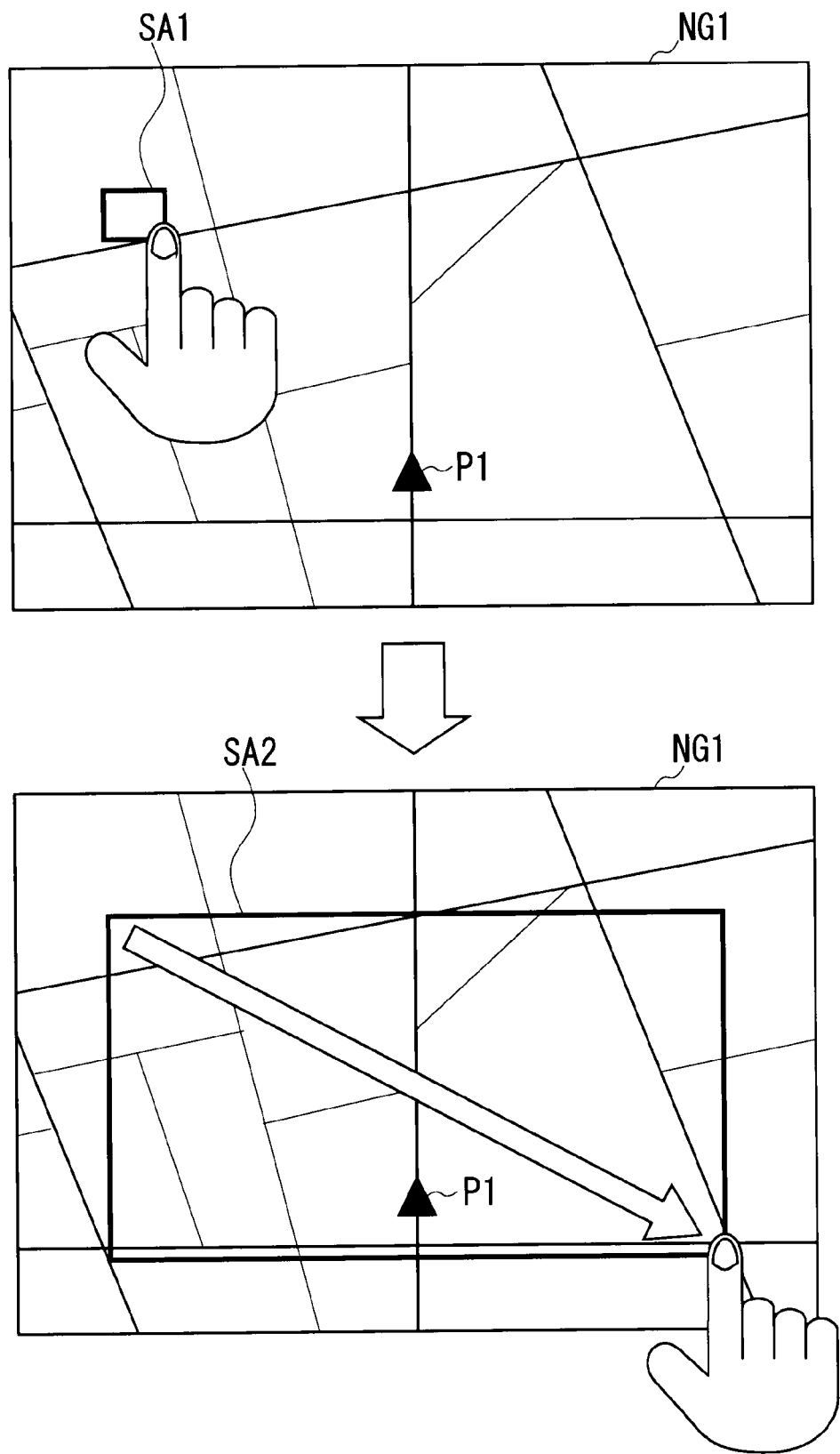
FIG. 6 shows a schematic view to explain a dynamic setting (1) of a search subject area setting frame.

In this case, as shown in FIG. 6, the CPU 20 of the PND 1 overlaps and displays a rectangle search subject area setting frame SA1 which is slightly larger than the fingertip of the user on the navigation map image NG1.

When it is recognized that the search subject area setting frame SA1 touched by the fingertip of the user is traced in an arbitrary direction desired by the user, the CPU 20 of the PND 1 enlarges the rectangle size in this direction such that the diagonal of the search subject area setting frame SA1 is extended, or reduces the rectangle size in this direction such that the diagonal of the search subject area setting frame SA1 is reduced, and the rectangle size is fixed when the fingertip of the user is released from the screen, and thus fixed search subject area setting frame SA2 is recognized and determined as the search subject range desired by the user.

In this way, the CPU 20 of the PND 1 can search the nearest point (convenience store and gas station) desired by the user in the range of the search subject area setting frame SA2 including a vehicle position mark P1 indicative of the vehicle position of a vehicle to which the PND 1 is mounted.

Figure 7:
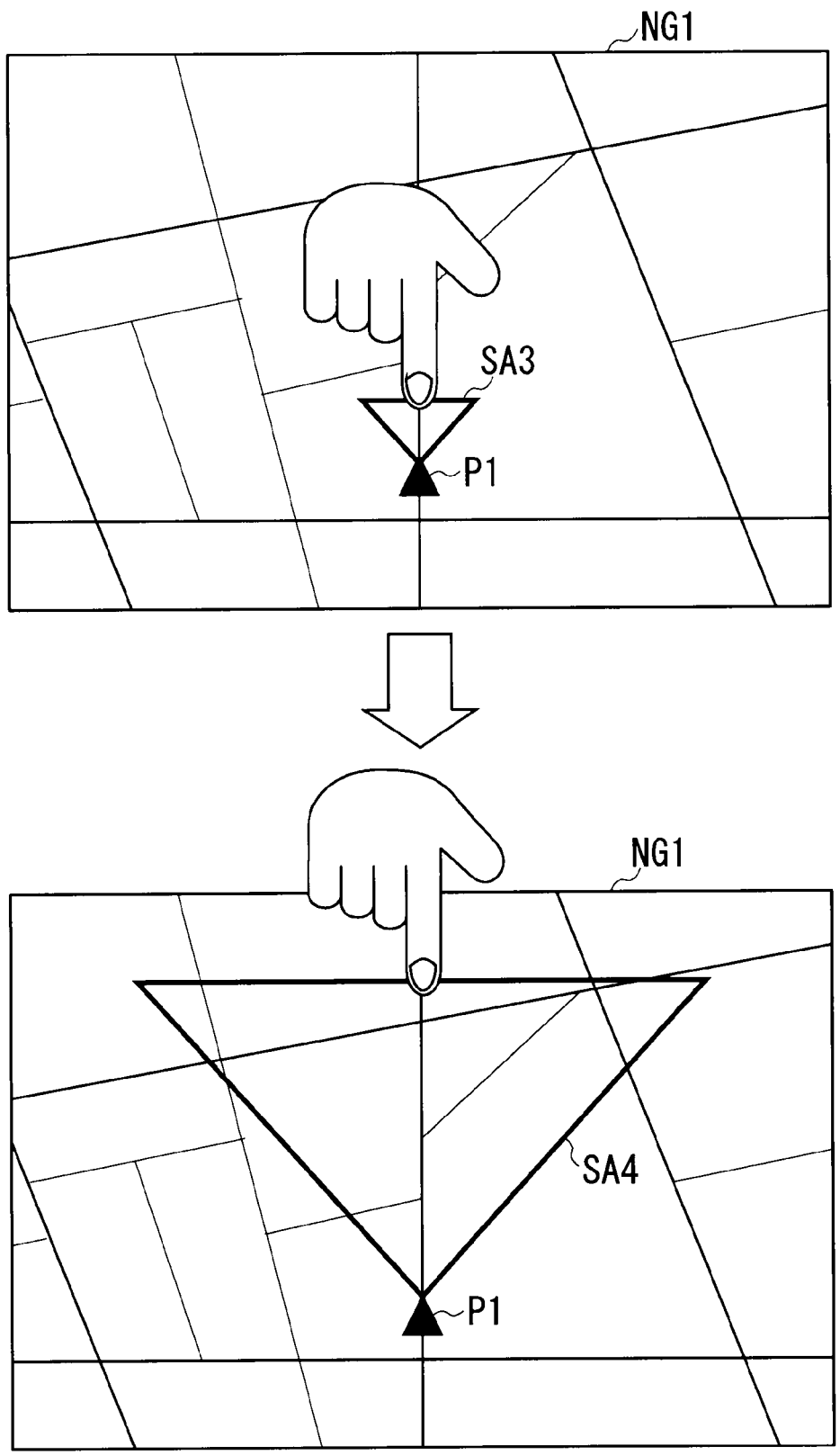
FIG. 7 shows a schematic view to explain a dynamic setting (2) of the search subject area setting frame.

On the other hand, for example, as shown in FIG. 7, the CPU 20 of the PND 1 may overlap and display a search subject area setting frame SA3 in the form of an inverted triangle which is slightly larger than the fingertip of the user on the navigation map image NG1.

In this case, when it is recognized that the search subject area setting frame SA3 touched by the fingertip of the user is traced in an arbitrary direction desired by the user (for example, traveling direction of the vehicle position mark P1), the CPU 20 of the PND 1 enlarges the triangle of the search subject area setting frame SA3 in this direction, or reduces the triangle of the search subject area setting frame SA3 in this direction, and the triangle size is fixed when the fingertip of the user is released from the screen, and thus fixed search subject area setting frame SA4 is recognized and determined as the search subject range desired by the user.

In this way, with the search subject area setting frame SA4 which is positioned at the front side of the vehicle position mark P1 set for the final search subject range, the CPU 20 of the PND 1 can search the nearest point (convenience store and gas station) desired by the user. Accordingly, from a region to which the user can easily visit by a vehicle, only a useful search result can be provided.

In step SP7, the CPU 20 of the PND 1 determines whether or not the search subject range desired by the user can be determined through the search subject area setting frame SA1 or SA3 of the navigation map image NG1 (FIG. 6 and FIG. 7).

When the negative result is obtained, this represents that the specification through the search subject area setting frame SA1 or SA3 is being performed and has not been completed, and the CPU 20 of the PND 1 repeats the processing after step SP6, and waits until the final search subject range can be determined.

On the other hand, when the positive result is obtained in step SP7, the CPU 20 of the PND 1 goes to the next step SP8, and the search processing with respect to the nearest point (convenience store and gas station) desired by the user is executed in the search subject range determined in step SP7, and the processing goes to the next step SP9.

In step SP9, the CPU 20 of the PND 1 presents the search processing result executed in step SP8 by reflecting the search processing result on the navigation map image NG1 (FIG. 6 and FIG. 7), and the processing goes to the next step SP10 to end the processing.

Figure 8:
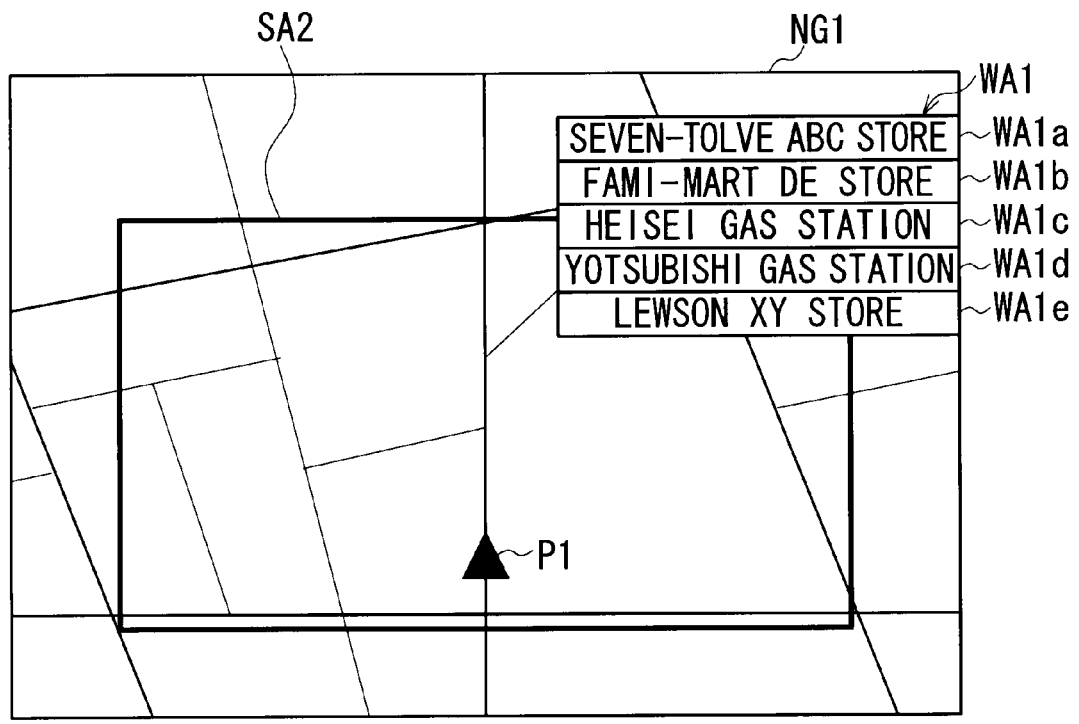
FIG. 8 shows a schematic view indicative of a search processing result presentation screen (1)

In this case, for example, as shown in FIG. 8, the CPU 20 of the PND 1 overlaps and displays the nearest point list display frame WA1 which is the search processing result on the navigation map image NG1, and makes the user visually confirm respective list candidates WA1a to WA1e.

Accordingly, when it is recognized that any one of the list candidates WA1a to WA1e of the nearest point list display frame WA1 is touched to be operated by the fingertip of the user, the CPU 20 of the PND 1 switches the image to a map image corresponding to the touched candidate of the WA1a to WA1e.

Figure 9:
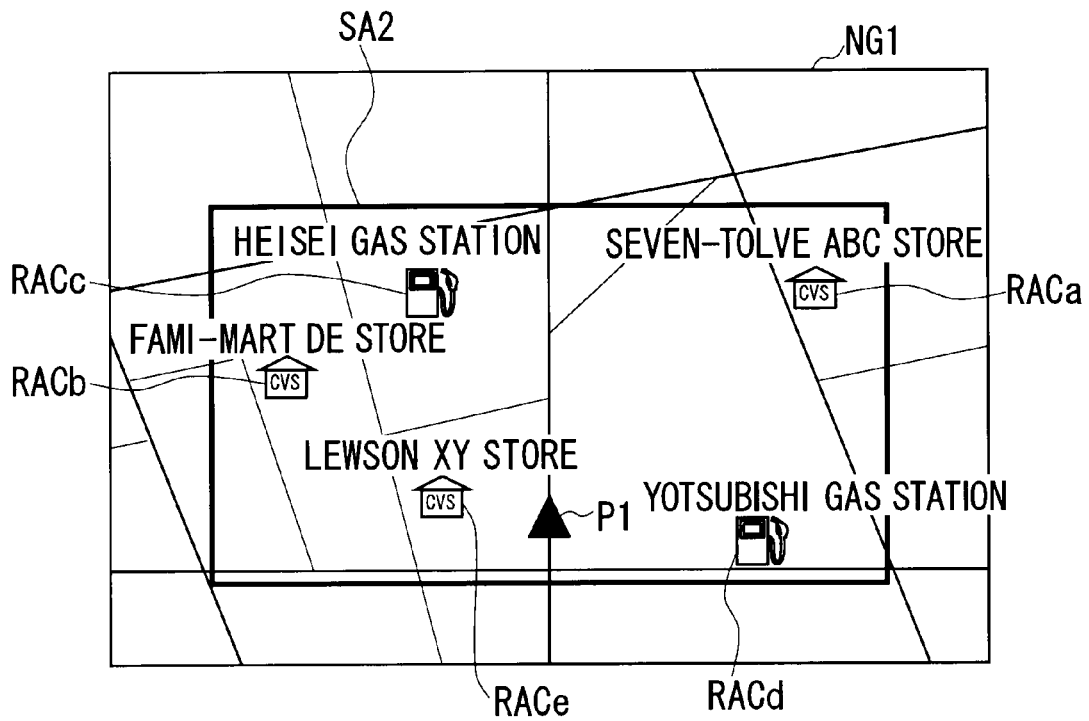
FIG. 9 shows a schematic view indicative of a search processing result presentation screen (2)

The present invention is not restricted to the configuration in which the CPU 20 of the PND 1 overlaps and displays the nearest point list display frame WA1 on the navigation map image NG1. For example, as shown in FIG. 9, in the search subject area setting frame SA2 set as the search subject range, list candidate icons RACa, RACb, RACc, RACd, and PACe corresponding to the list candidates WA1a to WA1e respectively may be displayed on corresponding positions on the map.

In this case, the CPU 20 of the PND 1 can make the user visually recognize the positional relationship of how the convenience store and gas station of the nearest point are positioned around the vehicle position mark P1, and thus the user can intuitively and instantly determine to which nearest point the user should proceed.

(5) Operation and Effect

In the above-described configuration, on the navigation map image NG1 displayed on the LCD 24 of the monitor 3, in case the search subject range desired by the user is specified, the CPU 20 of the PND 1 displays the rectangle search subject area setting frame SA1 or triangle search subject area setting frame SA3 which is slightly larger than the fingertip of the user, and, when the frame is touched and traced in a direction desired by the user, the user can specify the size and range of the final search subject range.

At this time, by making the user visually confirm the state of the dynamically changing in size and range from the search subject area setting frame SA1 or SA3 to the search subject area setting frame SA2 or SA4, and specify the final search subject range by only the touch operation using the fingertip of the user, the CPU 20 of the PND 1 can instantly determine the search subject range on which the size and range intuitively desired by the user is faithfully reflected when the touch operation by the user is released.

Accordingly, in the PND 1, when the nearest point desired by the user is searched in the search subject range specified by the user, a search processing result of the nearest point that is obtained by targeting only at a desired range on the map which the user wants to search can be provided to the user.

In this way, since a search processing result which is not desired by the user is not presented, the PND 1 can make the user operate the PND 1 in a stress free state, which can significantly reduce the operation burden on the user and further improve the operability and convenience.

Furthermore, by displaying a search processing result of the nearest point in the search subject range represented by the search subject area setting frame SA2 or SA4 as list candidate icons RACa, RACb, RACc, RACd, and RACe on corresponding positions on the map respectively, it becomes possible to make the user intuitively and instantly recognize the nearest point which is closest from the current position represented by the vehicle position mark P1, and determine the nearest point as a stop-off point in a short time, which can further improve the convenience of the user.

Under the above-described configuration, on the navigation map image NG1, by making the user touch the search subject area setting frame SA1 or SA3, and trace the frame in an arbitrary direction, the CPU 20 of the PND 1 can determine the search subject area setting frame SA2 or SA4 of size and range desired by the user as the final search subject range, which can present a search processing result of the nearest point with respect to a region on which the intention of the user is reflected.

(6) Other Embodiments

Figure 10:
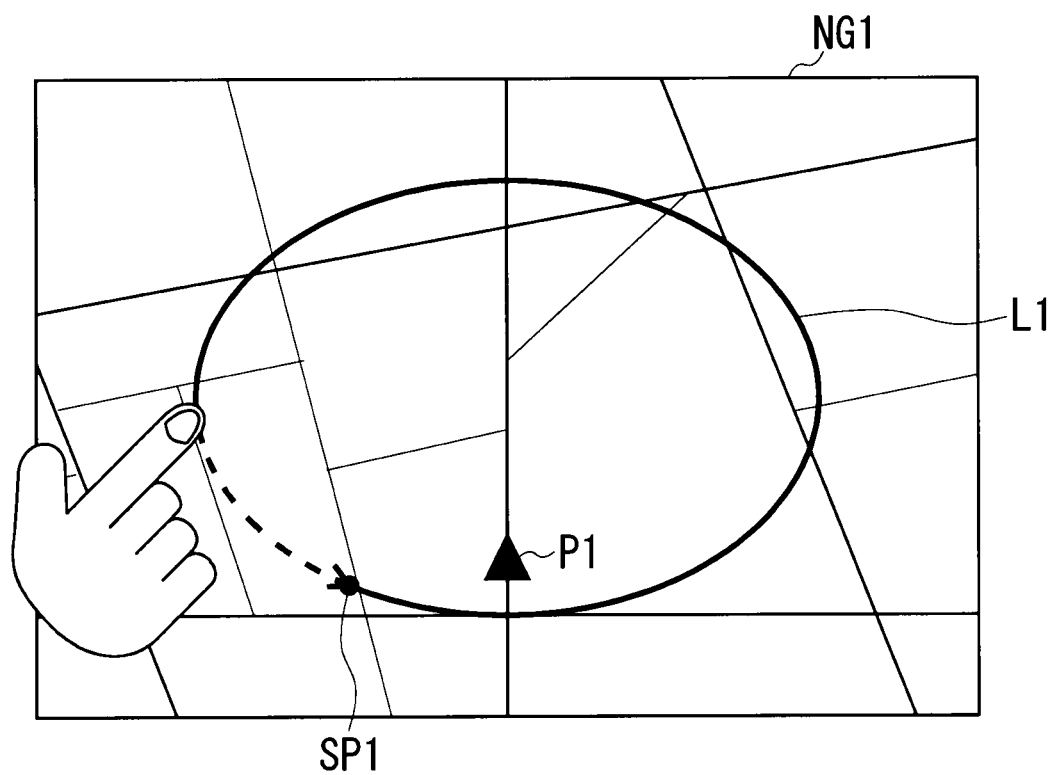
FIG. 10 shows a schematic view to explain a method of setting a search subject range in another embodiment.

In above-described embodiment, the search subject area setting frame SA2 or SA4 which is determined by touching the search subject area setting frame SA1 or SA3, and tracing the frame in an arbitrary direction desired by the user is determined as the final search subject range. However, the present invention is not restricted thereto, and as shown in FIG. 10, a search subject area setting frame L1 in the form of a circle which is drawn by touching an initial contact point SP1 on the screen of the LCD 24 that displays the navigation map image NG1, and tracing the point in a predetermined direction may be determined as the final search subject range.

Furthermore, in the above-described embodiment, the rectangle search subject area setting frame SA2, or triangle search subject area setting frame SA4 which is determined by touching the search subject area setting frame SA1 or SA3, and tracing the frame in an arbitrary direction desired by the user is determined as the final search subject range. However, the present invention is not restricted thereto. The final search subject range may be determined by touching a search subject area setting frame in the form of a pentagon, a hexagon, or a circle, and tracing the frame in a direction desired by the user.

Furthermore, in the above-described embodiment, the present invention is applied to the portable type PND 1 which can be carried about and used mainly in a vehicle. However, the present invention is not restricted thereto. The present invention may be applied to a fixed type vehicle navigation device that is mounted on a vehicle.

Figure 11:
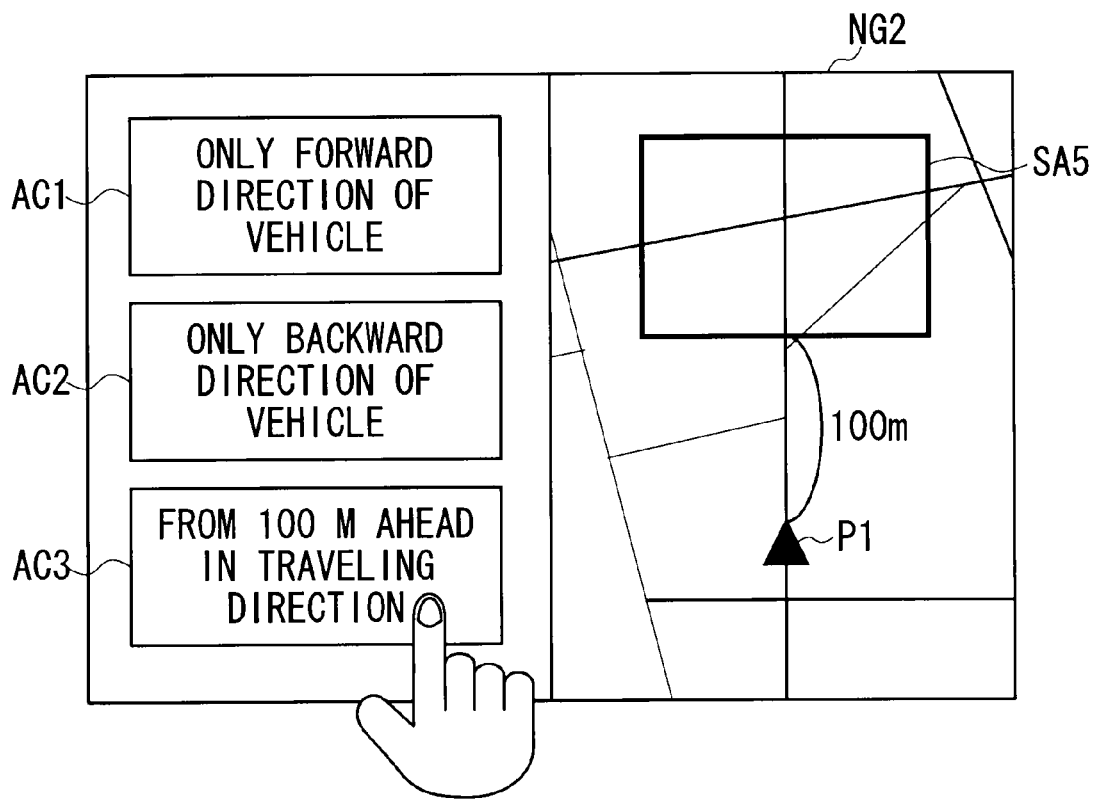
FIG. 11 shows a schematic view to explain a method (1) of determining a search subject area setting frame in another embodiment.

Furthermore, in the above-described embodiment, the search subject area setting frame SA2 or SA4 which is determined by touching the search subject area setting frame SA1 or SA3, and tracing the frame in a direction desired by the user is determined as the final search subject range. However, the present invention is not restricted thereto. For example, as shown in FIG. 11, there may be employed a configuration in which "only forward direction of vehicle" icon AC1, "only backward direction of vehicle" icon AC2, and "from 100 m ahead in traveling direction" icon AC3 are displayed on a navigation map image NG2, and a region corresponding to any one of the "only forward direction of vehicle" icon AC1, "only backward direction of vehicle" icon AC2, and "from 100 m ahead in traveling direction" icon AC3 touched by the fingertip of the user is automatically determined as the final search subject range.

In this case, when the "only forward direction of vehicle" icon AC1 is touched to be operated, the CPU 20 of the PND 1 determines a rectangle range which is positioned in the forward direction of the vehicle position mark P1 and is several 100 m square as the search subject range. When the "only backward direction of vehicle" icon AC2 is touched to be operated, the CPU 20 of the PND 1 determines a rectangle range which is positioned in the backward direction of the vehicle position mark P1 and is several 100 m square as the search subject range. When the "from 100 m ahead in traveling direction" icon AC3 is touched to be operated, the CPU 20 of the PND 1 determines a rectangle range SA5 of a predetermined size which is set at 100 m ahead in traveling direction of the vehicle position mark P1 as the search subject range.

Figure 12:
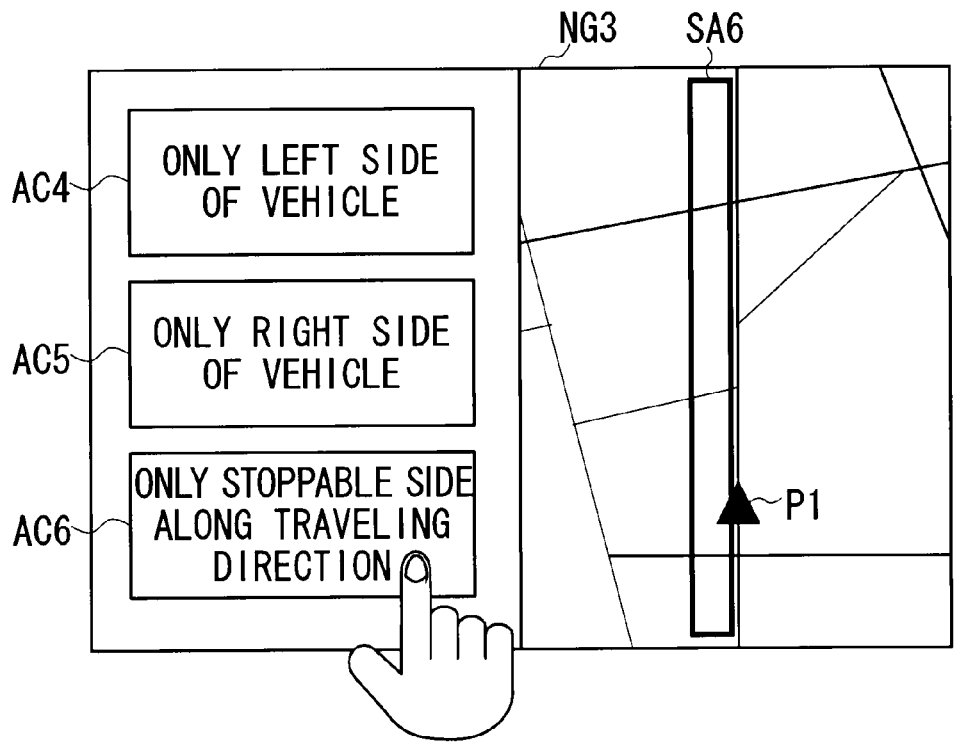
FIG. 12 shows a schematic view to explain a method (2) of setting a search subject area setting frame in another embodiment.

Furthermore, in the above-described embodiment, the search subject area setting frame SA2 or SA4 which is determined by touching the search subject area setting frame SA1 or SA3, and tracing the frame in a direction desired by the user is determined as the final search subject range. However, the present invention is not restricted thereto. For example, as shown in FIG. 12, there may be employed a configuration in which "only left side of vehicle" icon AC4, "only right side of vehicle" icon AC5, and "only stoppable side along traveling direction" icon AC6 are displayed on a navigation map image NG3, and a region corresponding to any one of the "only left side of vehicle" icon AC4, "only right side of vehicle" icon AC5, and "only stoppable side along traveling direction" icon AC6 touched by the fingertip of the user is automatically determined as the final search subject range.

In this case, when the "only left side of vehicle" icon AC4 is touched to be operated, the CPU 20 of the PND 1 determines a rectangle range which is positioned on the left side of the vehicle position mark P1 and is several of 100 m square as the search subject range. When the "only right side of vehicle" icon AC5 is touched to be operated, the CPU 20 of the PND 1 determines a rectangle range which is positioned on the right side of the vehicle position mark P1 and is several 100 m square as the search subject range. When the "only stoppable side along traveling direction" icon AC6 is touched to be operated, the CPU 20 of the PND 1 determines a rectangle range SA6 representing a region where the vehicle can stop from the left side traffic lane (for example, in Japan) along the traveling direction of the vehicle position mark P1 as the search subject range.

Furthermore, in the above-described embodiment, the CPU 20 of the PND 1 executes the above-described nearest point search processing procedure in accordance with a nearest point search processing program stored in the nonvolatile memory 21. However, the present invention is not restricted thereto. The CPU 20 of the PND 1 may execute the above-described nearest point search processing procedure in accordance with a nearest point search processing program installed from a recording medium, a nearest point search processing program downloaded from the Internet, or a nearest point search processing program installed through other various routes.

Furthermore, in the above-described embodiment, the LCD 24 as a display unit and the CPU 20 as a search unit and a search subject range determination unit configure the PND 1 as the navigation device of the present invention. However, the present invention is not restricted thereto. The navigation device may be configured by a display unit, a search unit, and a search subject range determination unit of other various circuit configurations.

The navigation device and nearest point search method according to the present invention can be applied not only to a vehicle navigation device such as the PND but also to other various electronic devices such as a notebook type personal computer provided with the navigation function, a game machine provided with the navigation function, and a cellular phone provided with the navigation function.

It should be understood by those skilled in the art that various modifications, combinations, sub-combinations and alterations may occur depending on design requirements and other factors insofar as they are within the scope of the appended claims or the equivalents thereof.

What is claimed is:

1. A navigation device that has a navigation function and guides a travel path from a current position of the navigation device to a destination on a map image, the device comprising:
   a display that displays the map image;
   circuitry configured to:
   search for a point of interest existing around the current position on the map image;
   dynamically change a search subject area for searching for the point of interest by enlarging and reducing a search subject area setting frame on the display, the search subject area setting frame designating the search subject area, when a designation specified by a user is received by the navigation device; and
   automatically determine the search subject area setting frame based on a current traveling direction of the navigation device and whether an area on the map image is a vehicle stoppable area.

2. The navigation device according to claim 1, wherein the circuitry overlaps the search subject area setting frame of a predetermined size on the map image and the display displays the overlapped search subject area setting frame and the map image.

3. The navigation device according to claim 1, wherein the circuitry determines, by the designation of the user, a location on the map image of the search subject area setting frame to be in any one of a forward direction, backward direction, right direction, or left direction from the current position.

4. The navigation device according to claim 1, wherein the circuitry determines the search subject area setting frame on a vehicle stoppable side in the current traveling direction.

5. The navigation device according to claim 1, wherein the circuitry determines the search subject area setting frame on the display to be in a forward direction from the current position toward the current traveling direction of the navigation device.

6. The navigation device according to claim 1, wherein the circuitry determines the search subject area setting frame on the display to be in a forward direction from the current position by a predetermined distance toward the current traveling direction of the navigation device.

7. A search method for a navigation device that has a navigation function and guides a travel path from a current position of the navigation device to a destination on a map image, the method comprising:
   displaying the map image on a display;
   searching, by circuitry, for a point of interest existing around the current position on the map image;
   dynamically changing, by the circuitry, a search subject area for searching for the point of interest by enlarging and reducing a search subject area setting frame on the display, the search subject area setting frame designating the search subject area, when a designation specified by a user is received by the navigation device, the circuitry identifying the designation specified by the user based on a touch by the user on the search subject area setting frame on the display; and
   automatically determining, by the circuitry, the search subject area setting frame based on a current traveling direction of the navigation device.

8. The search method according to claim 7, further comprising
   overlapping, by the circuitry, the search subject area setting frame of a predetermined size on the map image and
   displaying the overlapped search subject area setting frame and the map image on the display.

9. The search method according to claim 7, further comprising
   determining, by the designation of the user, a location on the map image of the search subject area setting frame to be in any one of a forward direction, backward direction, right direction, or left direction from the current position.

10. The search method according to claim 7, further comprising
    determining the search subject area setting frame on a vehicle stoppable side in the current traveling direction.

11. The navigation device according to claim 5, wherein the circuitry determines the search subject area setting frame to be in a form of an inverted triangle.

12. A navigation device that has a navigation function and guides a travel path from a current position of the navigation device to a destination on a map image, the device comprising:
    a display that displays the map image;
    circuitry configured to:
    search for a point of interest existing around the current position on the map image;
    dynamically change a search subject area for searching for the point of interest by enlarging and reducing a search subject area setting frame on the display, the search subject area setting frame designating the search subject area, when a designation specified by a user is received by the navigation device; and automatically determine the search subject area setting frame based on a current traveling direction of the navigation device, wherein
the circuitry identifies the designation specified by the user based on a touch by the user on the search subject area setting frame on the display.

13. The navigation device according to claim 12, wherein the circuitry overlaps the search subject area setting frame of a predetermined size on the map image and the display displays the overlapped search subject area setting frame and the map image.

14. The navigation device according to claim 12, wherein the circuitry determines, by the designation of the user, a location on the map image of the search subject area setting frame to be in any one of a forward direction, backward direction, right direction, or left direction from the current position.

15. The navigation device according to claim 12, wherein the circuitry determines the search subject area setting frame on a vehicle stoppable side in the current traveling direction.

16. The navigation device according to claim 12, wherein the circuitry determines the search subject area setting frame on the display to be in a forward direction from the current position toward the current traveling direction of the navigation device.

17. The navigation device according to claim 16, wherein the circuitry determines the search subject area setting frame to be in a form of an inverted triangle.

18. The navigation device according to claim 12, wherein the circuitry determines the search subject area setting frame on the display to be in a forward direction from the current position by a predetermined distance toward the current traveling direction of the navigation device.

19. The navigation device according to claim 12, wherein the circuitry determines the search subject area setting frame based on the current traveling direction of the device and whether an area on the map image is a vehicle stoppable area.

* * * * *